United States Patent [19]

Kanniainen et al.

[11] Patent Number: 4,741,082
[45] Date of Patent: May 3, 1988

[54] METHOD FOR MANUFACTURING AND REINFORCING A CATALYTIC UNIT INTENDED FOR PURIFYING EXHAUST GASES

[75] Inventors: Kauko Kanniainen; Veikko Loukeinen, both of Vihtavuori, Finland

[73] Assignee: Kemira Oy, Helsinki, Finland

[21] Appl. No.: 42,310

[22] Filed: Apr. 24, 1987

[30] Foreign Application Priority Data

Apr. 29, 1986 [FI] Finland .................................. 861801

[51] Int. Cl.$^4$ ............................................. B21D 53/00
[52] U.S. Cl. ................................. 29/157 R; 422/180
[58] Field of Search .................... 29/157 R, DIG. 48; 60/272, 282, 299; 422/177, 180

[56] References Cited

U.S. PATENT DOCUMENTS

| | | | |
|---|---|---|---|
| 4,186,172 | 1/1980 | Scholz | 29/157 R X |
| 4,220,625 | 9/1980 | Toh et al. | 422/177 X |
| 4,381,590 | 5/1983 | Nonnenmann et al. | 29/157 R |
| 4,521,947 | 6/1985 | Nonnenmann et al. | 29/157 R |
| 4,598,063 | 1/1986 | Retallick | 29/157 R X |

*Primary Examiner*—Howard N. Goldberg
*Assistant Examiner*—Irene Cuda
*Attorney, Agent, or Firm*—Thomas R. Vigil

[57] ABSTRACT

The invention relates to a method for making and reinforcing a catalytic unit intended for purifying exhaust gases, in which method a helical catalytic unit is formed from a corrugated foil band (2) and a straight foil band (3), placed one on top of the other, by securing the foil bands, coated in advance with both a layer of support material and a layer of catalyst material, to a central shaft (4), around which the catalytic unit is formed. Thereafter, end supports (5) are secured to the ends of the shaft in such a way that they press somewhat to inside the unit and prevent movement of the foil bands in relation to each other.

6 Claims, 2 Drawing Sheets

METHOD FOR MANUFACTURING AND REINFORCING A CATALYTIC UNIT INTENDED FOR PURIFYING EXHAUST GASES

The present invention relates to a method for manufacturing and reinforcing a catalytic unit intended for the purification of exhaust gases, by forming a helical unit by winding from a corrugated foil band and a straight foil band disposed one on top of the other.

Such a unit is previously from, for example, G.B. Pat. No. 2069364 (United Kingdom). According to this method, the unit is first made from uncoated foil bands, and at both or one of the ends of the unit there are welded one or several seams the purpose of which is to prevent axial movement of the helical foil bands in relation to one another. In this method the catalytic unit cannot be coated with a support material and a catalytic material until after the welding, since the support material lowers the electric conductivity and prevents the flow of current during welding. When the support material is added to a complete unit, it does not spread evenly but accumulates in the cavities formed by the meeting points of the foils and collects in itself the actual catalyst, in which case the catalyst material will not be used effectively, a factor which for its part increases the costs and lowers the efficiency. The seams produced do not necessarily withstand the stresses the unit is subjected to during use.

D.E. Pat. No. 2924592 (Federal Republic of Germany) discloses making a catalytic unit, in which method an uncoated corrugated foil band and an uncoated straight foil band are secured together by brazing. This method has a disadvantage in that in connection with the brazing it is necessary to use high temperatures, which results in the weakening of the structure and a deterioration of the surface.

In this method, also, the catalytic unit cannot be coated until after the foils have been secured together. In addition, the brazing is difficult to carry out.

The object of the present invention is to provide a method for making and reinforcing a catalytic unit, a method which does not have the disadvantages of previously known methods. According to the invention, this is achieved by securing a corrugated foil and a straight foil, coated in advance with both a supporting material layer and a catalyst layer, to a central shaft, which is a thin rod and around which the catalytic unit of the desired size is formed, whereafter end supports having at maximum the length of the diameter of the unit are secured to the ends of the shaft in such a way that they press somewhat to inside the unit, thereby preventing axial movement of the foils in relation to each other.

According to the present invention, a catalytic unit is obtained which keeps its shape even when subjected to great stress. The system according to the invention prevents the movement and rubbing of the foils against each other, which could cause the catalyst layer to be rubbed off and, furthermore, the channels to be clogged as the unit is twisted.

Before forming a helical catalytic unit, both the corrugated foil band and the straight foil band are coated according to the invention first with the support material and then with the catalyst material. Thereafter the foil bands, placed one on top of the other, are secured to the central shaft, which serves as the rotation shaft at the manufacturing stage of the catalytic unit. The central shaft is a thin rod, preferably slit at both ends, which helps the securing of the shaft to the rotating device. The slits at the ends of the shaft may be parallel or may run in different directions, for example, be perpendicular to each other.

When the unit is of the desired size, the foil bands are cut and their ends are secured to the unit. The unit is detached from the rotating device, the shaft remaining as a support shaft inside the catalytic unit, and transverse end supports are secured to the ends of the shaft. The end supports should preferably have the length of the diameter of the catalytic unit so that the catalytic unit becomes a rigid piece which retains its shape.

The end supports are pressed into slits preferably located at the ends of the shaft, in such a way that the supports press about 1-3 mm to inside the unit, preventing the movement of the foil bands in relation to each other. Thereafter, the end supports are secured firmly to the ends of the shaft, for example by welding. In this case only the ends of the shaft are exposed to the heat caused by the welding, and so the heat will not damage the catalytic unit.

According to one embodiment of the invention, an end support can be made up of two or several supports placed crosswise and fitted into a slit of a suitable shape formed at the end of the shaft.

An end support can be secured to the central shaft also in some manner other than that described above, for example by drilling through the center of gravity of the end support a hole into which the end of the central shaft is fitted and secured. Except by welding, the end support can also be secured by, for example fitting a cotter pin into a hole drilled transversely through the end of the shaft after the shaft has been fitted into the hole formed in the end support.

The central shaft and the end supports are preferably made of fire-resistant steel.

The invention is described below with reference to the accompanying figures, in which FIG. 1 depicts an end view of a catalytic unit according to the invention, and FIG. 2 depicts a side view of a preferred embodiment of the invention.

Figure 1:
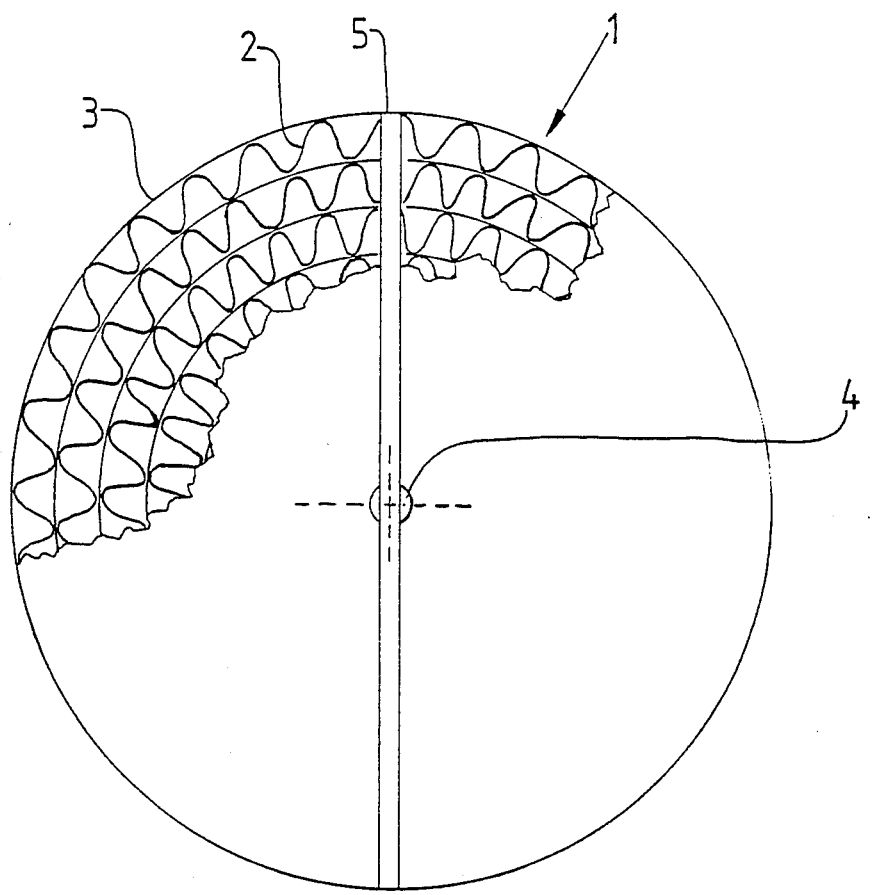
FIG. 1 shows a catalytic unit (1) wound from a corrugated foil band (2) and a straight foil band (3), placed one on top of the other, there being an end support (5), having the length of the diameter of the unit, fitted in a slit at the end of the central shaft (4) of the unit.
Figure 2:
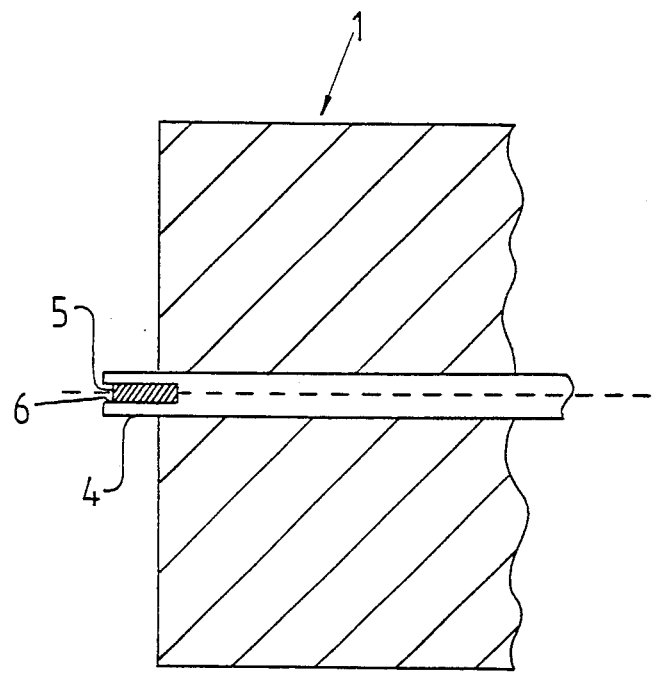
FIG. 2 shows a preferred embodiment of the invention, in which an end support (5) has been fitted into the slit (6) in the central shaft (4) of the catalytic unit (1) in such a way that it presses somewhat to inside the unit.

I claim:

1. A method for making and reinforcing a catalytic unit used for the purification of exhaust gases by forming a helical catalytic unit from a corrugated foil band and a straight foil band said method comprising the steps of: coating the corrugated and the straight foil bands with both a support-material layer and a catalyst layer, placing said bands one on top of the other, securing the bands to a central shaft, around which the catalytic unit of a desired size if formed, and securing rigid end supports to the ends of the shaft in such a way that they press about 1-3 mm into the inside of the catalytic unit thereby preventing movement of the foil bands in relation to each other.

2. The method according to claim 1, further including the step of making slits at both ends of the central shaft into which the end supports are pressed and secured.

3. The method according to claim 2, further including the step of making the slits parallel.

4. The method according to claim 2, further including the step of making the slits approximately perpendicular to each other.

5. The method according to claim 1, further including the step of making at least one of the end supports of one or several supports disposed crosswise.

6. The method according to claim 1, further including the step of securing the end supports to the ends of the central shaft by welding.

* * * * *